United States Patent [19]
Thompson

[11] 3,838,593
[45] Oct. 1, 1974

[54] ACOUSTIC LEAK LOCATION AND DETECTION SYSTEM

[75] Inventor: Jeffrey L. Thompson, Hopatcong, N.J.

[73] Assignee: Esso Research and Engineering Company, Linden, N.J.

[22] Filed: Nov. 6, 1972

[21] Appl. No.: 303,996

[52] U.S. Cl. ............. 73/40.5 A, 73/69, 181/.5 LD, 340/6 R
[51] Int. Cl. .......................... F17d 3/04, G01m 3/24
[58] Field of Search ............. 73/40, 40.5 A, 40.5 R, 73/49.2, 69, 70; 181/.5 LD; 340/16 R, 6 R

[56] References Cited
UNITED STATES PATENTS

| | | | |
|---|---|---|---|
| 1,738,094 | 12/1929 | Caldwell et al. | 73/70 |
| 1,886,914 | 11/1932 | Slichter | 73/69 |
| 2,166,991 | 7/1939 | Guanella | 340/6 R X |
| 2,170,487 | 8/1939 | Soler | 340/16 R |
| 2,420,439 | 5/1947 | Morrison | 340/16 R |
| 2,982,942 | 5/1961 | White | 73/69 X |
| 3,249,911 | 5/1966 | Gustafsson | 340/6 R |
| 3,413,653 | 11/1968 | Wood | 73/40.5 A X |
| 3,478,576 | 11/1969 | Bogle | 73/40.5 A |
| 3,508,433 | 4/1970 | Bustin | 73/40.5 A |

Primary Examiner—Richard C. Queisser
Assistant Examiner—Joseph W. Roskos
Attorney, Agent, or Firm—F. Donald Paris

[57] ABSTRACT

A system for locating and detecting acoustic noise sources such as liquid or gas leaks in the presence of conflicting ambient (i.e., background) noise by implementing one point correlation. In a preferred embodiment the device employed comprises a pair of spaced sensors mounted on a movable connecting arm, each of which provides an output signal representative of a noise source which is sent to an electronic circuit including correlator wherein the signal is processed and the correlator output is monitored on a meter. The time average of the instantaneous product of the detected signals will be very low except when nearly identical signals are processed. When the sensors are equidistant from the noise source the correlator output signal is at a maximum, thus providing an indication that the noise source is located in a central plane normal to the axis of the mounting arm. By scanning the suspect area in two or more planes, the noise source may be precisely located from a distance.

13 Claims, 6 Drawing Figures

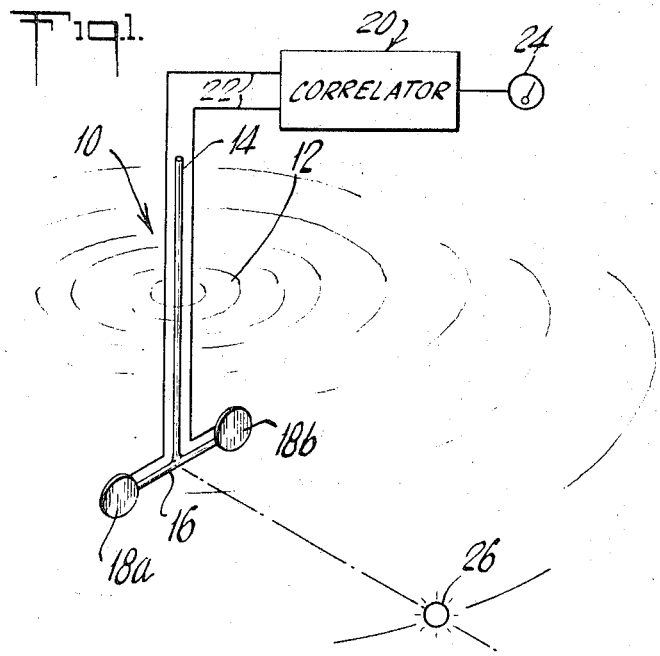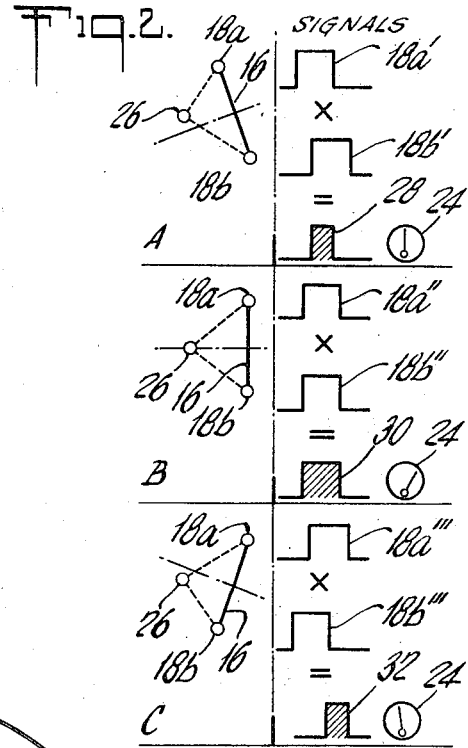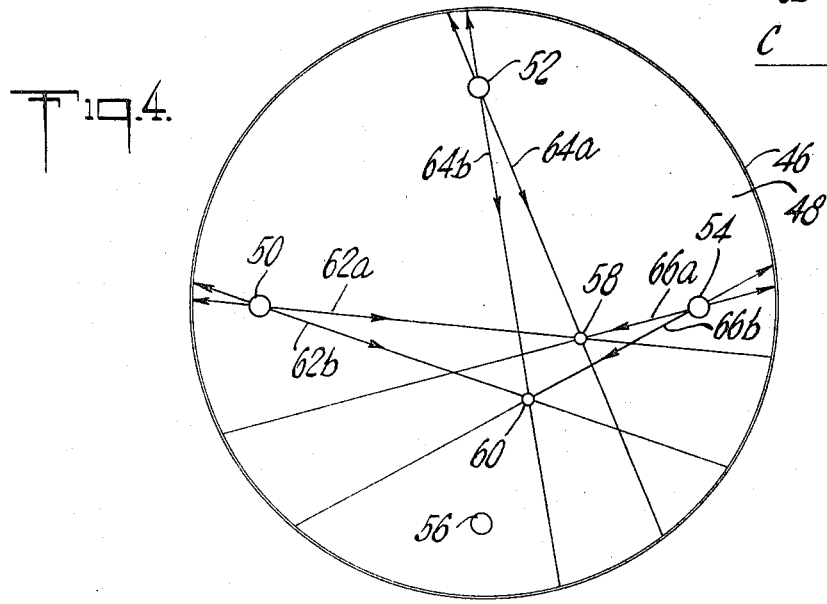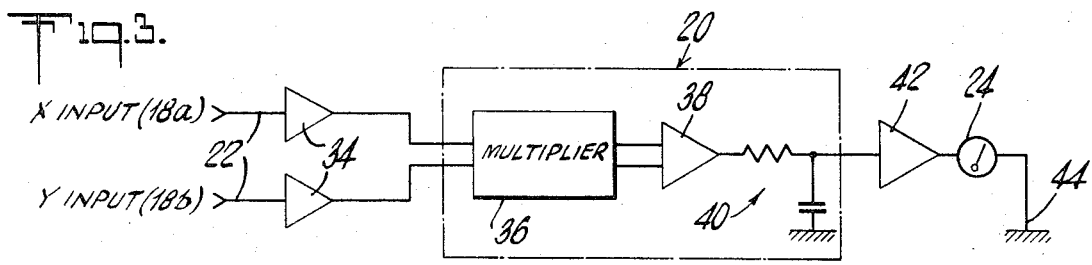

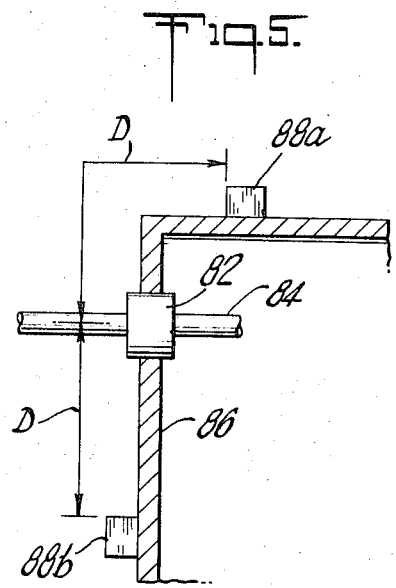
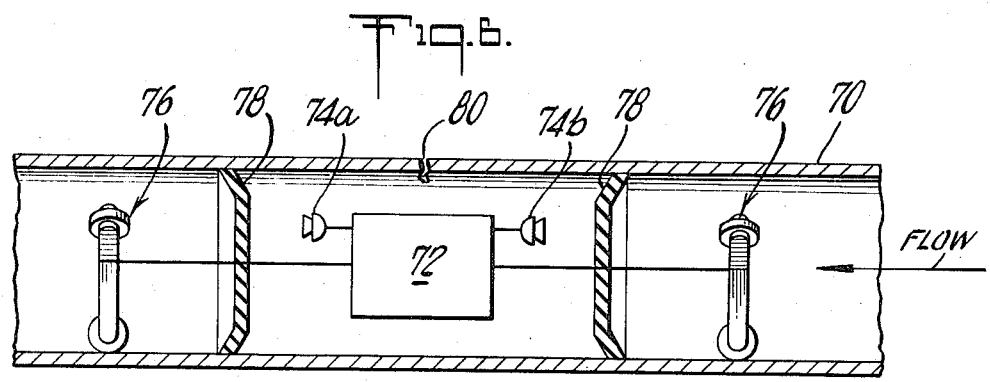

ACOUSTIC LEAK LOCATION AND DETECTION SYSTEM

BACKGROUND OF THE INVENTION

The need for a system to locate leaks in vessels such as storage tanks and especially one having substantially sensitivity, speed, simplicity and safety is desirable in order to decrease turnaround time associated with tank inspection and maintenance operations and to locate leaks in newly-constructed tanks. If the location of a leak is known prior to draining a tank or identified prior to its being placed in service, the necessary inspection and repair work can be greatly expedited. Such a system is particularly desirable for larger tanks, since the bottom area of these large tanks can be more than 30,000 square feet, involve about 6,500 linear feet of welds, and any one of these welds can be a source of a leak. Many leaks associated with new tanks have ultimately been traced to unrepaired construction drainage holes. In the case of existing tanks, although they may be smaller than the newer larger tanks, the problem is equally as great because of possible bottom corrosion leading to leakage in areas other than at the welds. There also exists a need for such systems in pipelines and solid systems.

Present techniques of low pressure liquid leak detection including the measurement of loss of liquid height, container or pipeline input and output volume measurements, and direct visual evidence. The current methods for acoustic detection of gas and high pressure liquid leaks employ a single pick-up sensor which is scanned very near a suspect area or made to be somewhat directional (that is, by attaching columns or reflectors to the sensor, or employing baffles to reduce noise from outside the area of interest) so that the distance from a probable leak site may be increased. While it is known to employ multiple stationary sensor and a full scale multi-point correlator, this approach entails approximately two orders of magnitude greater cost and complexity than the present invention. Prior art directional sensor systems are easily overwhelmed by interference because all detected acoustic noise is additive on a non-discriminating basis, creating confused readout when a relatively weak source is to be detected in a relatively strong background.

Leak noise generation is a problem common to not only storage tanks but also high pressure pipelines and solid systems. Typical of some of the prior art concerned with the problems of leak detection and location are as follows: U.S. Pat. No. 2,940,302 — Scherbatoskoy; U.S. Pat. No. 3,170,512 — Long; U.S. Pat. No. 3,264,864 — Reid et al; U.S. Pat. No. 3,413,653 — Wood; U.S. Pat. No. 3,462,240 — Bosselaar et al; U.S. Pat. No. 3,478,576 — Bogle U.S. Pat. No. 3,508,433 — Bustin; U.S. Pat. No. 3,517,546 — Fraser; U.S. Pat. No. 3,561,256 — Bustin et al.

The foregoing prior art patents are primarily concerned with the detection and location of leaks in a pipeline by acoustic means. Another prior art patent relates to the use of acoustic means for locating leaks in reservoirs by employing spaced apart sound detectors and a binaural centering technique. Such a system is disclosed in the Slichter U.S. Pat. No. 1,886,914. The Crawford et al U.S. Pat. No. 2,989,726 is concerned with an autocorrelation technique.

SUMMARY OF THE INVENTION

The present invention relates to acoustic leak or noise source detection and location systems and more particularly to a novel system which implements the mathematical technique of correlation reduced to one point, which comprises complex multiplication. The invention employs moving sensors and a one-point correlator to detect and locate the acoustic noise source in the presence of conflicting ambient noise, with greater sensitivity, speed and safety than currently obtainable with the prior art systems and techniques.

A system constructed in accordance with the present invention for acoustically locating and detecting a leak or noise source such as liquid or gas leaks in the presence of conflicting ambient noise, typically comprises two movable sensors located at a prescribed distance apart, wherein the sensor outputs are amplified and multiplied together in an electronic multiplier. The time average of this instantaneous product will be very low except when very nearly identical signals are being multiplied. Assuming random sensor input noise, this criterion of a very low instantaneous product is satisfied except when the sensors are equidistant from the noise source. Rotation of the sensor mounting arm will at some point locate the sensors equidistant from the leak or noise source. In that position the plane normal to and passing through the center of the axis of the mounting arm will contain the noise source and the output of the correlator which receives the resultant output signals will be at a maximum. By scanning a suspect area in two or more planes, noise source or leaks may be precisely located even from a distance. Suppression of interfering noise is achieved by virtue of the electronic circuitry which responds only to near identical inputs whether alone or super-imposed on large interfering signals. The present apparatus and method has application not only in the detection and location of leaks from large storage tanks, but is also applicable to leaks and flow anomalies in gas phase or high pressure liquid systems, such as pipelines. Such detection can be implemented externally, using suitable sensors or internally whereby sensors and associated system components may be housed in a pipeline pig. It also has utility in monitoring suspect sites in solid systems such as machine frames and the like.

BRIEF DESCRIPTION OF THE DRAWINGS

FIG. 1 schematically illustrates a leak noise correlation apparatus constructed according to the present invention.

FIG. 2 illustrates graphically Correlator Output vs. Beam Rotation to show the operation of the present invention.

FIG. 3 illustrates a block diagram of the correlator circuit used in the present invention.

FIG. 4 illustrates a hypothetical map of a tank floor showing leak noise direction lines obtained by use of the present invention.

FIG. 5 illustrates the present invention typically employed in a solid system.

FIG. 6 illustrates the present invention typically employed in a pipeline.

DESCRIPTION OF THE PREFERRED EMBODIMENT

Having reference to the drawings wherein like parts are designated by the same reference numeral throughout the several views, FIG. 1 illustrates schematically a system according to the present invention for detecting and locating a leak or noise source. In a preferred embodiment this system generally designated 10 is shown immersed in a storage tank (not shown) having a liquid contained therein at a liquid level 12. The system as shown comprises a vertical probe bar 14 having mounted at its bottom end a horizontal connecting arm or bar 16. This arm may be connected so that it rotates relative to the probe 14, or, alternatively, can be fixed to the probe and the latter rotated so that the arm rotates in unison therewith. The probe assembly may be designed to collapse (umbrella style) permitting access to tank contents via small diameter openings. Movement may be obtained by manual turning or automatically by using suitable mechanical means or a plurality of spaced apart sensor pairs, disposed in the plane of rotation of arm 16 and electrically switched, by pairs, to simulate rotation of the probe. Each end of the movable connecting arm has a sensor 18a and 18b connected thereto. For liquid application of the system, the sensors comprise hydrophones which may be of any conventional type, preferably have a relatively flat frequency response in the desired noise detecting range and usually will incorporate an internal preamplifier. These sensors are connected via cables 22 to a correlator generally designated 20 (see FIG. 3 for delineation of 20) which processes the signals detected by the sensors. The correlator output is monitored by a conventional meter 24. It also may be desirable to have an oscilloscope (not shown) present during the testing to make certain that non-random noises such as those made by pumps and gear boxes and the like are not present in the detected signal.

With the sensors squarely facing the noise source 26, both sensors 18a and 18b will be located the same distance from the noise source and therefore will detect identical signals. The correlator 20, to be described in further detail hereinafter, detects the similarity of the two signals and produces a visible output on the meter 24, which is proportional to the degree of similarity of the signals. When the source or the sensor mounting arm 16 is moved so that the arm no longer faces the source 26 squarely (that is, each sensor being equidistant from the noise source), the sensors will be the different distances from the source and at a given instant will receive different input signals. In this latter situation, the correlator senses little or no similarity between the signals and thus, does not produce a maximum meter reading. In actual practice the more distant sensor receives the same signal as that detected by the nearest sensor, but it is delayed in time due to the difference in path lengths of the sensors. Angular sensitivity in terms of sensor mounting arm rotation is thus a function of spacing between the sensors, such that a close spacing yields coarse, angular sensitivity, while increased spacing yields very hgh angular discrimination.

As mentioned heretofore, the correlator circuitry determines the similarity of the two signals by multiplying them together at each instant in time and integrating the products for a small fraction of a second. This is illustrated schematically in FIG. 2. For purposes of illustration, the noise source 26 is presumed to emit a square wave pulse, shown as received by the sensors in the "Signals" column. The sensors 18a and 18b are shown pointed to one side of the source in FIG. 2a with the normal plane shown passing through the center of the sensor mounting arm 16. FIG. 2b shows the sensors pointed squarely at the noise source 26, and FIG. 2c shows the sensors pointed to the other side of the source 26. Assuming that the source 26 emits its square pulse at a time to, the sensors 18a and 18b will receive the pulse at different times depending on their distance from the source. In FIG. 2a the sensor 18a will receive the pulse first and produces an output signal 18a; however, the product of the two sensor output signals is still zero until the sensor 18b simultaneously receives the pulse and produces an output signal 18b'. The product of the two signals 18a' and 18b' is shown as wave form 28 in FIG. 2a. The indication shown on meter 24 corresponds to the area within the product 28. Thus, the product will drop to zero when the pulse at the sensor 18a terminates. In FIG. 2b wherein the sensors are equidistant from the source, the waves 18a'' and 18b'' emitted therefrom, are shown to provide a product signal 30 which results in a maximum indication on the meter 24, since both sensor output signals are emitted simultaneously. Likewise, in FIG. 2c the signal 18b''' emitted from the sensor 18b occurs prior to the beginning of the signal 18a''' emitted from the sensor 18a. This results in a product signal 32 which, as shown on the meter 24, is less than the maximum readout obtained in FIG. 2b. The correlation which is the area under the product signal shown at 28, 30 and 32 relates to exact angular location of the mounting arm 16. As seen by a comparison of FIG. 2b with FIGS. 2a and 2c, the maximum signal 30 occurs when the sensor mounting arm 16 is perpendicular to a vertical plane passing through the probe arm 14 containing the noise source 26. While it is believed that the foregoing brief discussion pertaining to correlation is satisfactory for purposes of the present invention, in-depth discussions on this topic can be obtained by reference to advanced electronics or signal processing texts such as "Detection of Signals and Noise" by A. D. Whelan, Chapter 2, Academic Press, 1971.

Reference is now made to FIG. 3 wherein there is shown a block diagram of the correlator circuit 20. The inputs to the correlator are designated X and Y corresponding to the signal inputs received from the sensors 18a and 18b, respectively. Each of these signals is fed via the cables 22 into a filter-preamplifier 34. Each filter-preamplifier suitably amplifies the received signal in this embodiment and also removes the low frequency information below a predetermined frequency. The amplified and filtered signal output is then fed into a multiplier 36 which performs the phase sensitive multiplication. The multiplier output is sent through an amplifier 38 which buffers the signal impedance and removes the common mode voltage. An RC averaging filter 40 connected at the output of the amplifier 38 derives the actual correlation. The output of this filter is then amplified through a meter amplifier 42 to provide sufficient drive for the readout meter 24 or a conventional level detector (not shown) which can provide a suitable alarm when the filter output exceeds a preset level. The instantaneous product coming from the multiplier buffer amplifier 38 prior to filtering may be observed on an oscilloscope to determine if periodic noises are present which may interfere with the operation of this system. Even in the presence of such noise the oscilloscope display will show the correlation for a random noise source such as a leak.

A suitable power supply (not shown) may be provided and should be reasonably stable. If a conventional power supply is used, it should be regulated as any rapid changes in the supply will be reflected as an offset indication in the meter.

The filter-preamplifier 34 employed is of a conventional nature employing transistors or integrated circuits and the amplifier also may include a feedback loop to stabilize the gain and operating point of the active devices and also should incorporate high pass filter characteristics.

The correlator itself is actually a complex or phase sensitive multiplier and typically may comprise a standard Motorola MC1495 multiplier. The purpose of the buffer amplifier 38 is to reduce the output impedance of the multiplier 36 and also to remove the common mode voltage. It is necessary that this amplifier have at least twice the full power bandwidth of the useful signal input frequencies as the multiplying process doubles the input frequency spectrum. A standard type of amplifier which typically may be used is the Precision Monolithics Inc. OP-01, although any suitable amplifier circuit integrated or otherwise will suffice. The meter amplifier 42 is a conventional amplifier which drives the readout meter 24. A gain switch (not shown) may be provided to increase meter sensitivity for very low level signals. A zero suppression control may be incorporated to permit viewing small variations superimposed on a high background signal.

The procedure for determining and locating a leak in a storage tank will now be explained in detail. To conduct the leak detection and location tests, it is desirable to schedule a period for testing when relatively loud (that is a sound level which would interfere with normal conversation) environmental noises at the tank will be a minimum. Pumping of the tank contents should also be suspended for the duration of the test. Initially the standard tests (e.g., gas) should be performed at the site to determine what safety precautions may have to be taken.

Once a safe and relatively quiet environment is assured, the equipment of the present invention is then set up. The sensor cables 22 are connected to the signal processor inputs X and Y. The oscilloscope may be connected to the signal processor output and the power is turned on. A qualitative check of system operability may be made by manually stroking both sensors simultaneously and noting the meter and oscilloscope for random indications. This ensures that the sensors and signal processor are operative. More precise system testing may employ a signal source in contact with the tank contents or tank shell which would be located by the system, providng system operability and sensitivity.

As best illustrated in conjunction with the typical map of a tank floor 48 of FIG. 4, the test is begun by lowering the probe into the tank contents. The sensors are initially deployed and the meter and oscilloscope are observed for received signals. The access holes 50, 52, 54, 56 located in the tank's roof may be employed for purposes of lowering the probe into the tank 46. Non-leak noises such as from rotating machinery will confuse the meter readout but will be very evident on the oscilloscope since they appear as a periodic or repetitive signal. If such periodic noises are observed, an attempt should be made to find and eliminate the source of noise as it can make the test interpretation difficult. Once this has been accomplished the probe is rotated slowly through a full circle while immersed in the tank contents. The meter and/or oscilloscope should be simultaneously monitored for leak indications which will show on both indicators as a sharp change in signal level. If any such indications are seen, a direction line such as 62a is drawn on the scale map of the tank running from the access hole location in use, which in this case is the hole 50, in the direction indicated by the probe, to both walls of the tank 46. This direction line 62a will actually locate the central plane which is normal to the mounting arm. The direction line 62b is similarly obtained. Thus, the direction lines 62a and 62b will provide a very general area for location of the suspected leak area. In order to provide an accurate fix, three or four rotations of the probe should be made. The above procedure is then repeated from a different access hole 52. By repeating the procedure described in regard to the access hole 50, further directional lines 64a and 64b can be obtained. To obtain accurate location of the leak, it is desirable to repeat this procedure for a total of three or more access holes. FIG. 4 illustrates that the access hole 54 was also employed and further direction lines 66a and 66b were obtained. If noise producing leaks are present in the tank, it will be indicated on the scale map of the tank by the intersection of three or more direction lines at a point. An example of a leak location is shown at points 58 and 60. This corresponds to the intersection of direction lines 62a, 64a, and 66a, and 62b, 64b and 66b. The detected location "site" is actually a vertical line; the intersection of 3 or more vertical planes. Should the location be at a wall, the vertical height of the leak may be found by disposing the hydrophones vertically and rotating the mounting bar about a horizontal axis which is perpendicular to the indicated direction to the leak. Signal maximum will occur as the arm squarely faces the leak, locating the leak in the vertical dimension.

There are certain characteristics of an acoustic leak signal which make the foregoing signal processing technique very desirable for high sensitivity testing. The generated signal is continuous, that is, there are no distinct, identifiable sharp peaks which occur. Thus, triangulation by measuring arrival time difference is not possible. Also, the signal is random, that is, signals detected at one instant are not like those detected in the past or future and hence each time segment of the signal is unique. By taking advantage of the foregoing characteristics, the present technique provides for a very desirable system for detecting and locating leak noise source.

The present one point correlation signal processing technique for detecting the noise energy and locating the source of the noise, particularly when applied to low pressure leakage, lends itself very well to detection by acoustical means.

While the present invention has been illustrated in connection with tankage leaks and particularly liquids, it also can be employed in air by using acoustic microphones for the sensors and suitable means to make them directional. The invention also can be used in a pipeline 70 (see FIG. 6) by mounting the necessary circuitry, recorder, power supplies, etc., in a sealed pig 72. The pig is propelled by product flow through the pipeline and has a pair of sensors 74a, 74b mounted externally of the pig container 72. A suitable support and centering device for the pig is shown generally at 76 at opposite ends of the pig and sound absorbent cups 78 are provided to reduce ambient noise. Once a leak, shown at 80, is centered between the sensors, a maximum readout will appear and by maintaining a record of the pig travel distance in the pipeline the location of the leak readily can be determined.

The principles of this invention also have utility for monitoring suspect sites in solid systems such as machine frames and the like. A typical arrangement is illustrated in FIG. 5. By employing contact microphones or accelerometers the characteristics of the noise received by these pickups can be used to determine the condition of an element such as a bearing on the basis of the sound conduction. By locating the bearing 82 of the shaft 84 mounted in the machine housing or frame 86 between the sensors 88a, 88b, extraneous noise can be eliminated. The spacing D of the sensors is determined as the mean distance from the bearing in the path the sound will take in the housing. By measuring the gross received noise at the amplifier input compared to the filter output, a measure of the noise generated within the bearing or gear under examination can be obtained. Thus, by comparing this noise with a suitable reference noise generated by the gearing or gear in a known condition the existing condition (e.g., deterioration) of the element can be determined. Pairs of these sensors may be located to monitor different parts of the system and suitable switching can be provided on a rotating basis to provide complete surveillance of the machine. By using the foregoing procedure a part(s) can be replaced before it fails and causes shutdown of the machine.

It will be understood that various changes in the details, arrangement of parts and operating conditions which have been herein described and illustrated in order to explain the nature of the preferred embodiments of this invention may be made by those skilled in the art within the principal, and that reference should be made to the following appended claims to determine the scope of this invention.

Having thus set forth the nature of the invention, what is hereinafter claimed as new, novel and unobvious is:

1. An acoustic leak detection and location system for a storage tank having access openings, for detecting and locating the presence of a leak in the storage tank by sensing signas emitted from a noise source therein, comprising, in combination: a pair of sensors spaced apart a fixed predetermined distance on a horizontal support member, said member and said sensors located within said tank and supported from a vertical mounting member extending through one of said access openings into said tank, said sensors sensing the presence of a noise source by receiving signals which are emitted from said noise source and producing output electric signals representative of the received signals, means for simultaneously varying by substantially equal amounts the relative phase relation of said output signals of said sensors, electronic circuit means including signal multiplier means connected to said sensors through cable means for receiving the sensor output signals and providing a continuous output signal which is a function of the instantaneous product of the signal outputs of the sensors and wherein the time average of said instantaneous product is at a maximum value when said noise source is equidistant from said sensors and is located in the central plane normal to the axis of said support member.

2. A system according to claim 1 wherein said sensors are mounted for rotatable movement relative to said vertical mounting member.

3. A system according to claim 2 wherein said sensors are mounted at opposite ends of said horizontal support member and said vertical mounting member is disposed perpendicular to and connected at one end at the center of said horizontal support member.

4. A system according to claim 1 wherein said second member is rigidly fixed to said first member.

5. A system according to claim 1 wherein said storage tank contains a liquid medium and each of said sensors comprises a hydrophone for detecting sounds in said liquid medium.

6. A system according to claim 1 wherein said electronic circuit means comprises preamplifier means for receiving the output signals of said sensors, said multiplier means connected for receiving the output signal of said preamplifier means, buffer amplifier means connected to the output of said multiplier means, and filter means for integrating the output signal of said buffer amplifier means.

7. A system according to claim 6 including means connected to the output of said filter for providing a visual indication of the presence of a noise source.

8. A system according to claim 6 including means connected to the output of said filter means for providing an alarm when the output of the filter exceeds a predetermined level.

9. A system according to claim 1 wherein said horizontal support member and said vertical mounting member comprise a probe assembly which is collapsible for facilitating access and removal of said assembly into and from said storage tank.

10. An acoustic monitoring system for continuously monitoring suspect sites in solid systems including a frame, comprising: first and second sensors for receiving acoustic signals characteristic of the condition of an element mounted on said frame and being monitored in said site; said element being located between said sensors; each of said sensors being located equidistant at a fixed predetermined distance from said element being monitored; electronic circuit means including signal multiplier means connected to said sensors for receiving output signals from said sensors which are representative of the received acoustic signals and providing an output signal which is a function of the instantaneous product of the signal outputs of said sensors, whereby the output signal of said electronic circuit can be compared to a reference signal characteristic of normal operation of the monitored element for permitting an indication of when replacement of said element may be required.

11. A method of detecting and determining the location of a leak in a storage tank by employing a probe assembly having a pair of sensors mounted a spaced fixed predetermined distance apart on a horizontal support arm and wherein said tank has access openings in the top thereof, and said probe assembly receives signals emitted from a noise source which is indicative of the presence of said leak, comprising the steps of: (a) eliminating substantially all loud environmental noise; (b) lowering said probe assembly into said tank through one of said access openings so that said sensors extend in a horizontal plane substantially into said tank;

(c) activating said sensors to monitor a predetermined area within said tank for noise sources; (d) monitoring the output signals from said sensors for maximum signal level as a function of the instantaneous product of the sensor output signals; (e) recording on a scale representation of said storage tank being monitored a direction line extending through said one of said access openings and a central plane normal to the horizontal axis of said support arm to the extremities of said storage tank; and (f) repeating the foregoing steps (b) through (e) for at least a second access opening of said storage tank, whereupon the intersection of the direction lines from steps (e) and (f) will locate said leak.

12. A method according to claim 11 including the steps of deploying the sensors vertically and repeating steps (c) and (d) for determining the vertical location of said noise source.

13. A method according to claim 11 including the step of rotating said probe assembly until the spacing of the sensors is such that they are at equidistant sound paths from the point of noise source being monitored, whereupon said maximum signal will be indicated.

* * * * *